(12) United States Patent
White et al.

(10) Patent No.: US 8,200,146 B2
(45) Date of Patent: Jun. 12, 2012

(54) BOOK SPREAD IDENTIFICATION ARRANGEMENT FOR A BOARD BOOK

(75) Inventors: Craig Allen White, Los Angeles, CA (US); Satyajit Deb, Plainfield, IL (US); Tao Xu, Naperville, IL (US); Xiaojun Zhang, Shenzhen (CN); Rong Zhang, Nanchang (CN)

(73) Assignee: Creata (USA) Inc., Oakbrook Terrace, IL (US)

( * ) Notice: Subject to any disclaimer, the term of this patent is extended or adjusted under 35 U.S.C. 154(b) by 129 days.

(21) Appl. No.: 11/990,908

(22) PCT Filed: Aug. 23, 2006

(86) PCT No.: PCT/IB2006/002288
§ 371 (c)(1),
(2), (4) Date: Dec. 28, 2009

(87) PCT Pub. No.: WO2007/023361
PCT Pub. Date: Mar. 1, 2007

(65) Prior Publication Data
US 2010/0148484 A1    Jun. 17, 2010

(51) Int. Cl.
*G09B 5/00* (2006.01)
(52) U.S. Cl. ........................................ 434/317
(58) Field of Classification Search ............... 434/317
See application file for complete search history.

(56) References Cited

U.S. PATENT DOCUMENTS

| | | | | |
|---|---|---|---|---|
| 5,167,508 A | * | 12/1992 | Mc Taggart | 434/317 |
| 5,475,205 A | * | 12/1995 | Behm et al. | 235/375 |
| 5,803,748 A | | 9/1998 | Maddrell et al. | |
| 6,358,615 B1 | * | 3/2002 | Imai | 428/447 |
| 2002/0130668 A1 | * | 9/2002 | Blades | 324/536 |

FOREIGN PATENT DOCUMENTS

| | | |
|---|---|---|
| JP | 59-153269 | 7/1984 |
| JP | 62-253494 | 10/2008 |
| JP | 2008527527 | 8/2011 |

OTHER PUBLICATIONS

China, Examination Report Jan. 22, 2010 Creat(USA)Inc.
Corresponding China appl. No. 200680039655.3 Aug. 23, 2006.
English translation China Patent 92111010 Sep. 28, 1992.

* cited by examiner

*Primary Examiner* — Xuan Thai
*Assistant Examiner* — Evan Page
(74) *Attorney, Agent, or Firm* — John J. Connors; Connors & Assoc. pc

(57) ABSTRACT

A book spread identification arrangement for a board book is provided, the arrangement comprising a plurality of conductive paths, contact means disposed adjacent at least part of at least one of the conductive paths and processing means connected to the conductive paths and configured for processing signals associated with the conductive paths. One selection end of each path is disposed adjacent the spine surface of the book. The contact means comprise one or more conductive surfaces and are arranged, upon opening of the book to a spread, to contact one of a plurality of combinations of one or more of the conductive paths. Each of the plurality of combinations is in a predetermined unique association with a respective single spread of the book. From the processed signals, the processing means are able to determine the particular combination of conductive paths contacted by the contact means and identify to which spread the book is open.

12 Claims, 10 Drawing Sheets

BOOK SPREAD IDENTIFICATION ARRANGEMENT FOR A BOARD BOOK

TECHNICAL FIELD

The present invention relates to a page/spread identification arrangement for books, and in particular to such an arrangement for board books.

BACKGROUND

Identifying to which page/spread a book has been open is very useful since it allows selective interaction with the user of the book depending on the content of the particular page/spread. One application that is particularly popular with board books for children involves an audio/visual presentation to the user of the book. In this case, the opening of the book to a particular spread can trigger recorded pronunciation of the name of a displayed object, recorded reading of a text displayed on the page, recorded song or other audio/visual effects associated with the content of the pages of the spread.

Various systems for page/spread identification have been developed. One system (U.S. Pat. No. 6,763,995 to Song) includes magnetic signature sensors configured to detect the magnetic signature of the pages as they are turned. The system is bulky and involves magnets inserted in pages, which is a safety hazard with small children. Another system (U.S. Pat. No. 5,803,748 and U.S. Pat. No. 6,041,215 to Maddrell et al.) relies on user applying a pressure on pressure sensitive switches inserted in passageways within the leaves of the book. Further system (U.S. Pat. No. 6,491,220 to May) employs flexible sensors affixed to each sheet to identify interaction of the user with the sheet. Another system, suggested by Li in U.S. Pat. No. 5,631,883, includes identification labels attached to the edge of the pages. A contact plate is depressed to contact an identification label and trigger identification of the corresponding page. Systems, using external optical devices to read identification codes printed on each page have also been suggested (U.S. Pat. No. 6,729,543 to Arons et al.)

The arrangements in the above systems are either somewhat complex ((U.S. Pat. No. 6,763,995; U.S. Pat. No. 6,491,220 and U.S. Pat. No. 6,729,543) or require user's participation in identifying the pages (U.S. Pat. No. 5,803,748, U.S. Pat. No. 6,041,215 and U.S. Pat. No. 5,631,883).

Accordingly, it would be preferable if a simple and reliable system for spread identification is designed that is triggered automatically upon opening of the book to a particular spread.

SUMMARY OF INVENTION

According to the invention, there is provided a book spread identification arrangement for a board book having a spine, the arrangement comprising:

- a plurality of conductive paths, one selection end of each path being disposed adjacent the spine surface of the book;
- contact means, comprising one or more conductive surfaces, the contact means being disposed adjacent at least a part of at least one of the conductive paths and arranged, upon opening of the book to a spread, to contact one of a plurality of combinations of one or more of the conductive paths, each of the plurality of combinations being in a predetermined unique association with a respective spread of the book; and
- processing means connected to the conductive paths and configured for processing signals associated with the conductive paths so as to determine the combination of conductive paths contacted by the contact means and identify the spread the book is open to.

Preferably, upon identification of the spread, the processing means trigger at least one of audio, visual or audio/visual presentation associated with the spread, the presentation including at least on of the following; reading of a text, singing a song, playing music, presenting images on a screen associated with the book and actuating mechanical movements of parts within a mechanical structure associated with the book.

Further according to the invention, the contact means are arranged to contact the paths adjacent their selection ends, the other processing end of each path being connected to the processing means, the arrangement being such that contact between at least one of the conductive surfaces of the contact means and each of the plurality of combinations of one or more conductive paths closes a predetermined unique combination of one or more circuits associated with the processing means, the processing means being arranged to determine the combination of closed circuits and identify the corresponding spread.

Preferably, if the book comprises an odd number of spreads, a spacer is inserted in the book so as to introduce an offset and allow the contact means to contact at least one conductive path when the book is open at the central spread.

According to one embodiment of the invention, the contact means are maintained at a predetermined common potential such that contact with the contact means brings the particular combination of contacted paths under the common potential.

Preferably, at least one of the plurality of conductive paths is of unique length and is, at least partially, disposed in or parallel to the spine surface of the book.

Preferably, the contact means comprise at least a first conductive strip arranged to protrude beyond the spinal surface of the book so as, upon opening of the book to at least some of the spreads, to effect the contact with the corresponding unique combinations of conductive paths.

More preferably, the contact means further comprise a second conductive strip, electrically connected to the first conductive strip, the second strip being arranged on the side of the book, opposite to the side having the first contacting strip, such that to protrude beyond the spine surface of the book so as, upon opening of the book to at least some of the spreads, to effect the contact with the corresponding unique combinations of conductive paths.

Further preferably, the conductive paths are divided into two sets, each conductive strip being arranged for contacting only paths of a single set.

Further preferably, the conductive strip located at a front page of the book is arranged, upon opening to book to a spread in the first half of the book, to contact paths disposed on the rear edge of the front page of a respective spread, while the conductive strip located at a back page of the book is arranged, upon opening the book to spreads in the second half of the book, to contact paths on the rear edge of the back page of a respective spread.

Further preferably, the conductive paths are disposed to partially extend in, or parallel to, a front page or a cover of the book, wherein the selection ends of the paths configured for contact with the conductive strip associated with a back page of the book are arranged to extend further than the selection ends of the paths configured for contact with the conductive strip associated with a front page of the book.

Further preferably, the conductive paths are disposed to partially extend in, or parallel to, a front page or a cover of the book, wherein the selection ends of the paths configured for contact with the conductive strip associated with a back page of the book and the paths configured for contact with the conductive strip associated with a front page of the book are symmetrically disposed with respect to a conductive path associated with the conductive strips.

Further preferably, at least one of the conductive paths comprises a conductive trace deposited onto a flexible thin film attached to the book and is, at least partially, made of silver, silver ink, carbon or other conductive material.

Further preferably, the processing means comprise at least one integrated circuit.

According to a second embodiment of the invention, each of the plurality of paths has unique predetermined resistance, the contact means being arranged, upon opening of the book to a spread, to contact a single conductive path, the processing means are connected to the processing end of the path and the contact means so as to be able to measure the resistance of the path and identify its corresponding spread.

Preferably, the plurality of paths is disposed, at least partially, along the length of the spine of the book.

More preferably, the unique resistance of each of the plurality of paths is defined, at least partially, by its unique length, thickness, width and/or material.

According to a third embodiment of the invention, the selection ends of at least some of the conductive paths are connected to at least one zebra-type connector and the contact means comprise sets of conductive surfaces, the sets being disposed in or parallel to the spine surface of the book and being arranged such that, upon opening of the book to a particular spread, at least one of the sets contacts, via at least one of the at least one zebra-type connectors, a predetermined unique combination of paths.

According to a another embodiment of the invention, the contact means comprise a plurality of conductive surfaces disposed in or parallel to the spine surface of the book so that, upon opening of the book to a particular spread, at least one of the conductive surfaces contacts a unique combination of two paths, adjacent their selection ends, so as to close a unique circuit associated with the processing means.

According to a further embodiment of the invention, each unique combination of circuits is characterised by a unique resistance, the unique resistance of each combination being defined, at least partially, by the unique length, thickness, width and/or material of at least one of the conductive paths included in the combination.

Preferably, the plurality of conductive surfaces extend in, or are parallel to, the spine surface of the book and are disposed so that, upon opening of the book to a particular spread, at least one of the surfaces contacts a unique combination of one or more paths, adjacent their selection ends, so as to define a unique circuit associated with the processing means, each circuit having unique predetermined resistance, the processing means being arranged to measure the resistance of the circuit and identify its corresponding spread.

According to a yet another embodiment of the invention, there is provided an arrangement comprising:
  a plurality of conductive paths, at least a selection of each path being disposed adjacent the spine surface of the book;
  contact means, comprising one or more conductive surfaces disposed adjacent the selection end of at least one of the conductive paths and arranged so that, upon opening of the book to a spread, at least one of the surfaces contacts a single conductive path of a predetermined length, the contact means being configured for sending an electromagnetic pulse along the contacted path and receiving the return pulse; and
  processing means connected to the conductive surfaces of the contact means and configured for processing signals associated with the conductive paths, calculating the time of a return trip of a pulse, estimating the traveled length and identifying the particular conductive path so as to determine the corresponding spread the book is open to.

BRIEF DESCRIPTION OF THE DRAWINGS

A preferred embodiment of the invention will now be described, by way of example only and with reference to the accompanying drawings wherein.

DETAILED DESCRIPTION OF THE PREFERRED EMBODIMENTS OF THE INVENTION

As illustrated in FIGS. 1 to 10, the book spread identification arrangement for a board book 1 comprises a plurality of conductive paths 2 and contact means having one or more conductive surfaces. The conductive surfaces are defined by the edges or the peripheral surfaces of conductive strips 3 (FIG. 1) or by contact areas 4 (FIG. 8) and are disposed adjacent one of the ends of the conductive paths. Processing means, including one or more integrated circuits (IC) 5, are connected to both the conductive strips and the conductive paths. If two integrated circuits are utilized, one of them is built into one of the cover pages of the book and the other one is built into the other cover page. The integrated circuits are configured for processing signals associated with the conductive paths.

A clarification is needed with respect to the terms "contact surfaces" or "conductive surfaces". While, in technical terms, the purpose of the contact means is to provide a "point" of contact, it is appreciated that, in order for the real application to produce a consistently reliable contact, the contact area should be larger than predetermined minimum area, depending on the application. Accordingly, throughout this application, the contact means will be referred to as conductive/contact "surfaces", and not conductive/contact "points".

Figure 1:
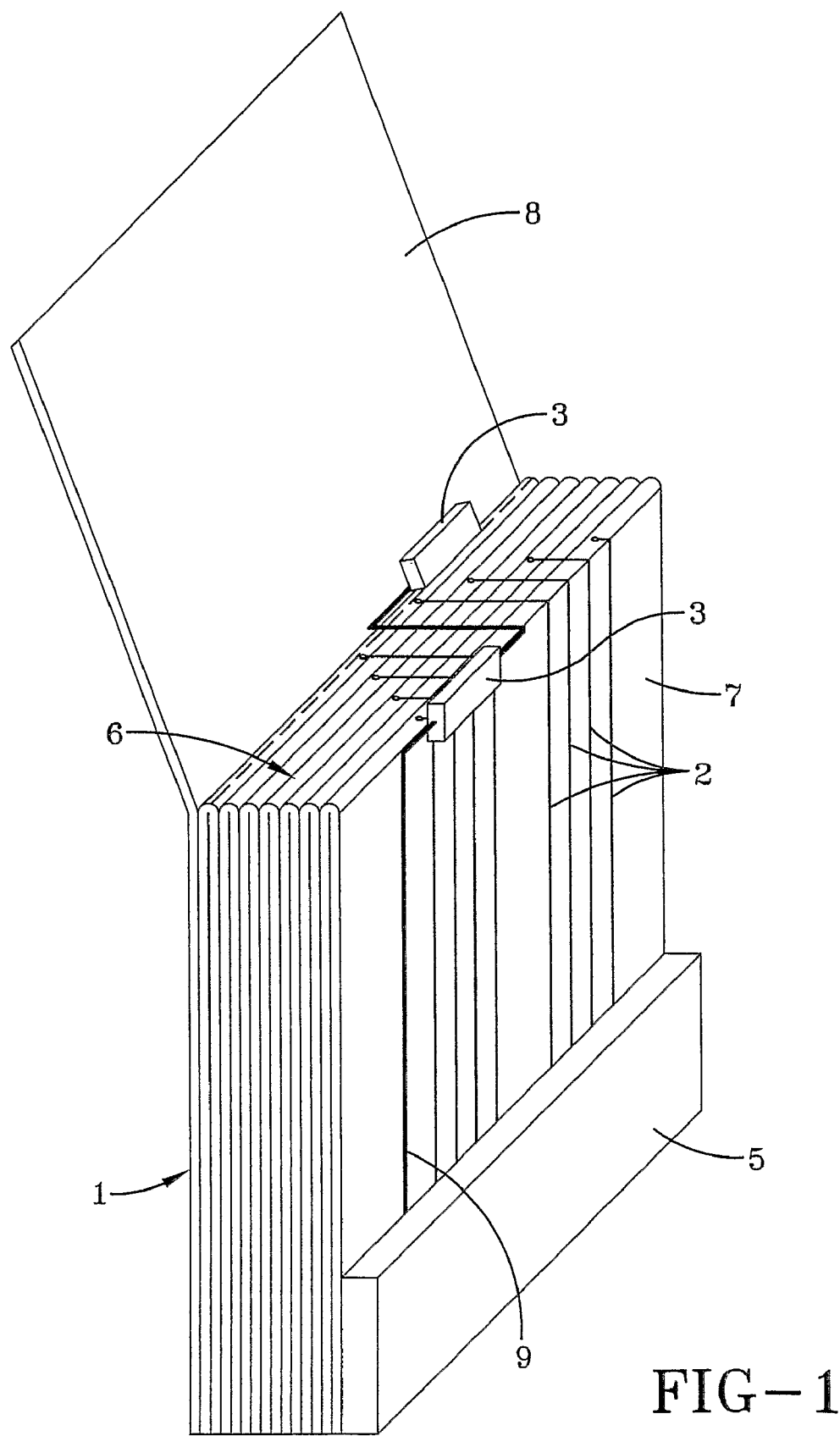
FIG. 1 is a schematic perspective view of an interaction between a conductive stripe and one configuration of conductive paths in a book spread identification arrangement, according to a first embodiment of the invention.

As seen in all of the figures, and FIG. 1 in particular, a portion of the conductive paths 2 is always located in, or near, the spine surface 6 of the book. Further in the description, the ends of the conductive paths that are adjacent the spine surface of the book and the contact means would be called selection ends, whilst the other ends will be called "processing ends" because in most of the embodiments they are connected with the processing means.

As illustrated in FIG. 1, a contact surface of one of the conductive strips 3 is arranged, upon opening of the book to a given spread, to contact a combination of one or more conductive paths. Each of the plurality of combinations is in a predetermined unique association with a different spread of the book. Accordingly, from the processed electrical signals, IC 5 is able to determine the particular combination of conductive paths contacted by the contact means and identify to which spread the book is open.

In the embodiment illustrated in FIGS. 1 to 7, there are two conductive strips 3 electrically connected to each other so as to maintain the same potential. One of them is attached to a front page 7 and the other one is attached to a back page 8 of the book, both of them being attached such as to protrude beyond the spinal surface so as to effect contact with a predetermined unique combinations of conductive paths. Of course, the use of a single strip or more than two conductive strips, as well as the use of conductive surfaces of other shapes, can also be envisaged. In addition, the strips do not have to be necessarily attached to the outermost pages of the book. They can be attached within the body of pages, can be part of the cover of the book, or can be even externally attached to the book. Similarly, whilst in this description the interaction between the conductive paths and the contact means is defined to be in the spine surface of the book, this should not be considered strictly limiting and any configuration located in the vicinity of the spine, such as the book cover, is also within the scope of the invention.

The particular identification mechanism in the embodiment of FIG. 1 is related to the fact that, when a contact surface contacts a combination of one or more conductive paths, this closes a predetermined unique combination of one or more circuits associated with the IC 5. The conductive strips 3 are connected to ground 9 and upon contact with the particular combination of contacted paths, the paths would also be connected to ground. IC is arranged to process the electrical signal received from the connected paths, to determine the combination of closed circuits and identify the corresponding spread.

Figure 2:
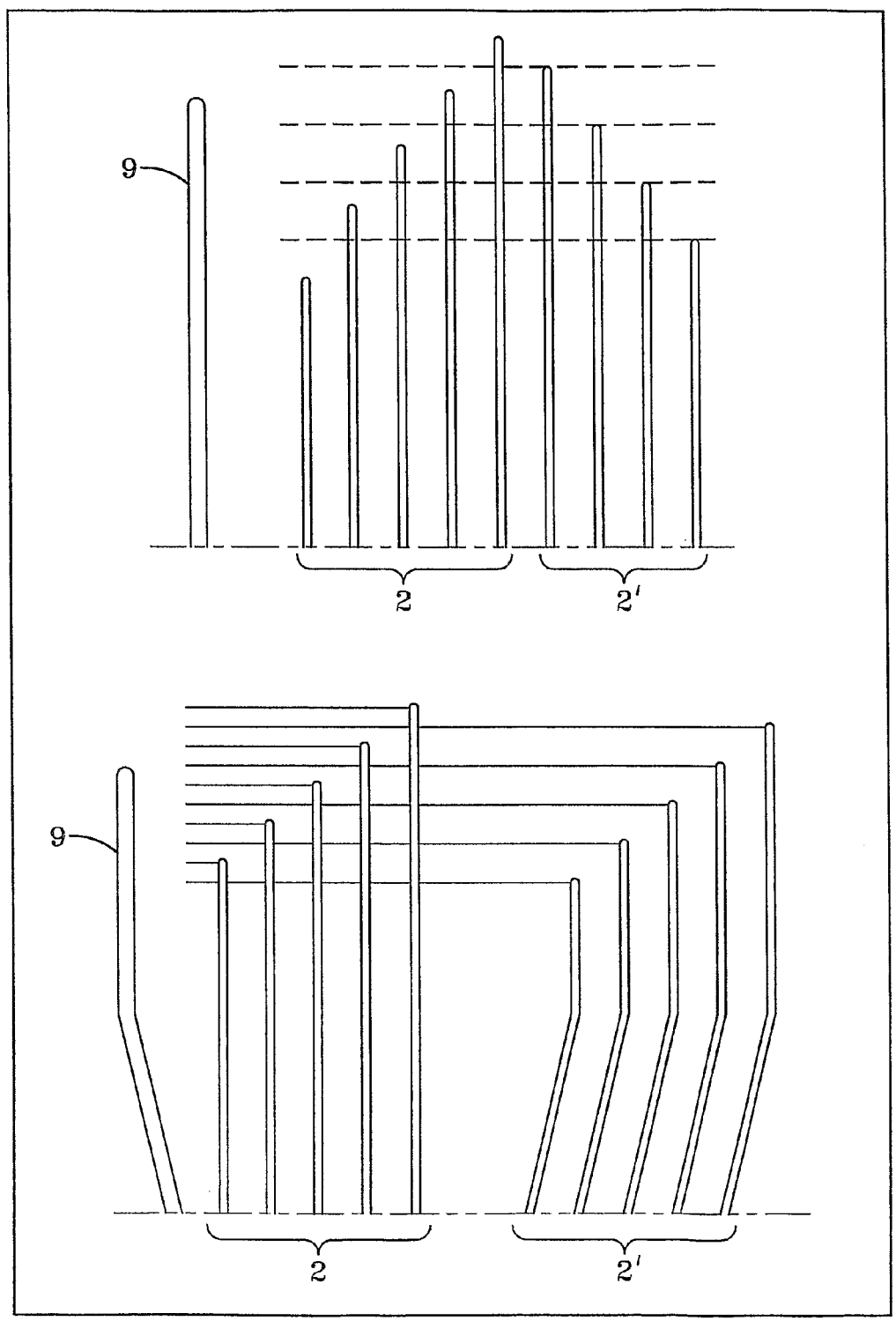
FIG. 2 is a schematic view of two different configurations of conductive paths of a book spread identification arrangement, according the first embodiment of the invention.

In the particular embodiment illustrated in FIGS. 1 to 4, the conductive paths are of unique length. One of the conductive strips 3 is associated with a front page of the book and the other one with a back page, both strips protruding from the spine surface of the book so as to contact the respective conductive paths upon opening of the book. It should be appreciated that, for a good electrical contact between the conductive strips and the conductive paths, the book has to be almost completely open at the particular spread. Accordingly, in this description the expression "opening of a book" and the like would be assumed to indicate that the book is open to an extent where conductive strips 3 contact the respective conductive paths deposited in spine surface 6 of the book As indicated in FIG. 2, the conductive paths of some of the preferred embodiments can formally be divided into two sets (marked with 2 and 2'), as the paths of a single set are arranged for contacting only one conductive strip. In the embodiment illustrated in FIG. 1, one of the contacting strips (the one associated with a front page 7 of the book) is attached to the surface of page 7 such that it overlays one of the set of paths. A thin layer of isolating material can be applied in the overlapping area to avoid the electrical contact between the strip and the paths beneath.

Figure 3:
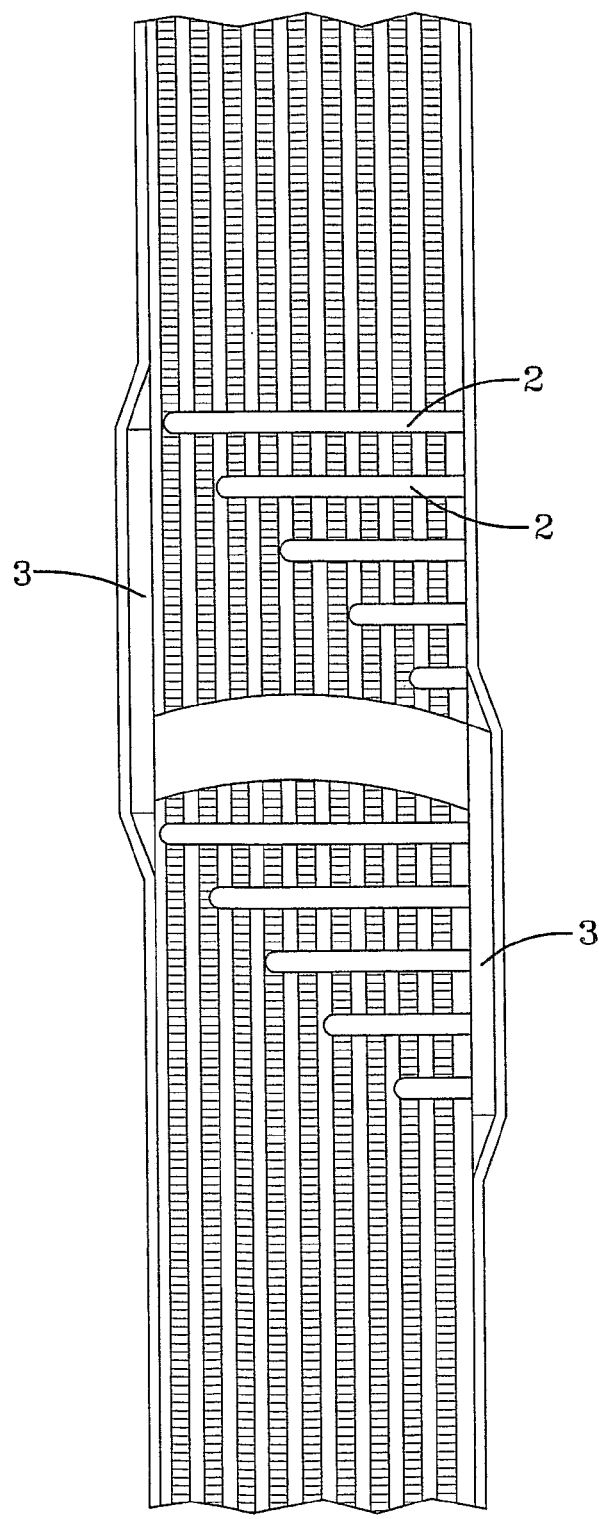
FIG. 3 is a schematic side view of the spine surface of a book having the book spread identification arrangement according to the first embodiment of the invention; wherein the conductive paths are in the second configuration of FIG. 2.
Figure 4:
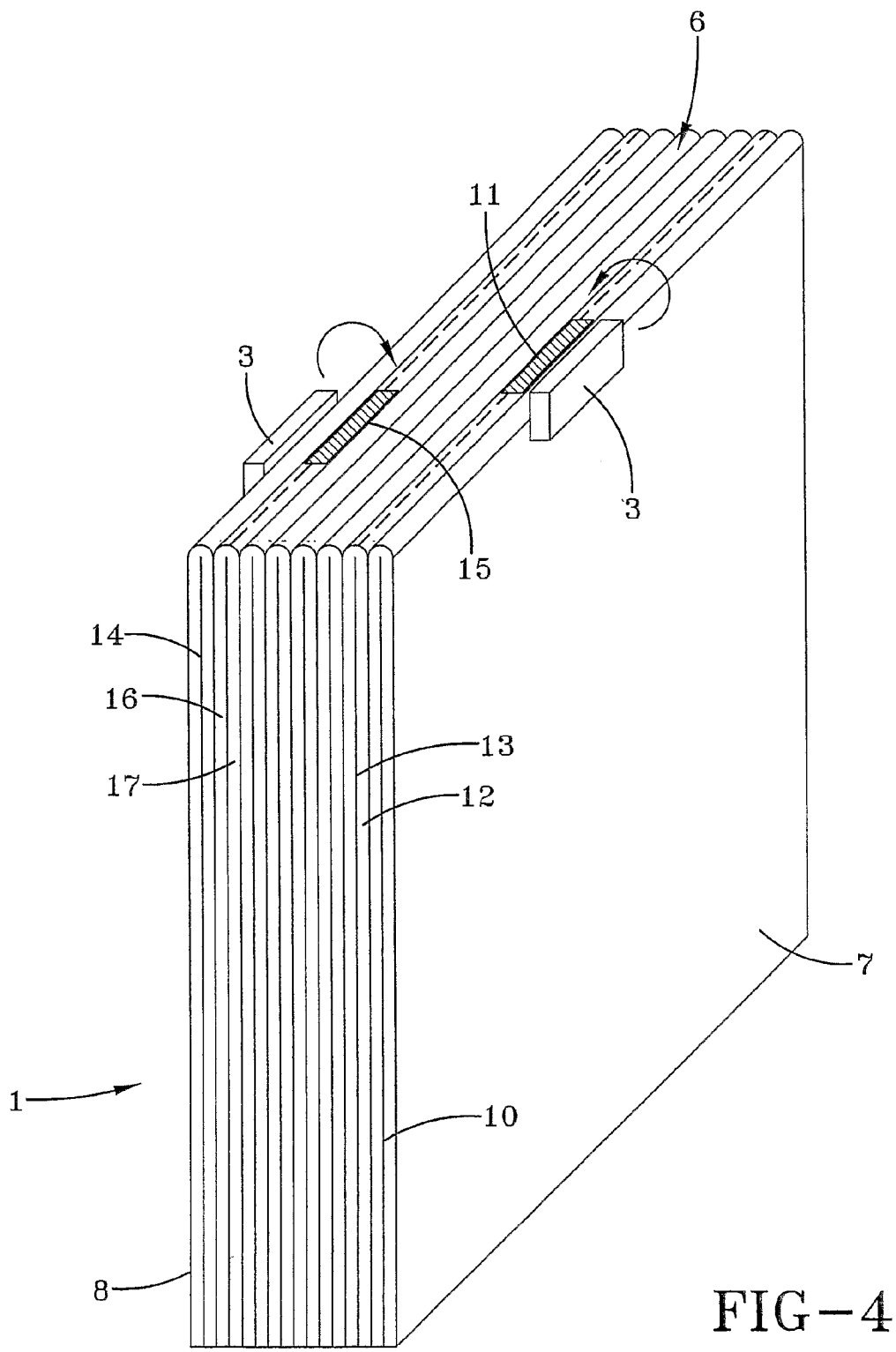
FIG. 4 is a schematic perspective view of a potential interaction between two conductive stripes and conductive traces in the spinal surface of the book in a book spread identification arrangement according to the first embodiment of the invention.

We will now consider the back edges of the pages that are part of a closed spread, the back of which is contacted by a conductive strip, when the book is open. As indicated in FIG. 1 and FIG. 4, the conductive strip 3, associated with a front page 7 of the book, is arranged, upon opening of the book to a spread 10 in the first half of the book, to contact paths at location 11 that are disposed on the rear edge of the front page 12 of a respective closed spread 13. On the other hand, the conductive strip 3 associated with a back page 8 of the book is arranged, upon opening of the book to spread 14 in the second half of the book, to contact paths at location 15, disposed on the rear edge of the back page 16 of a respective closed spread 17. As best shown in FIGS. 2 and 3, one way to accommodate the mechanics of such an interaction between the strips and the conductive paths, is by making sure that either the entire paths or at least the selection end sections of the paths configured to be contacted by a conductive strip associated with a back page of the book are of different lengths to the paths configured to be contacted by a conductive strip associated with a front page of the book. However, this is not necessary the case and paths of equal lengths, or two substantially identical sets of paths can also be used.

Figure 5:
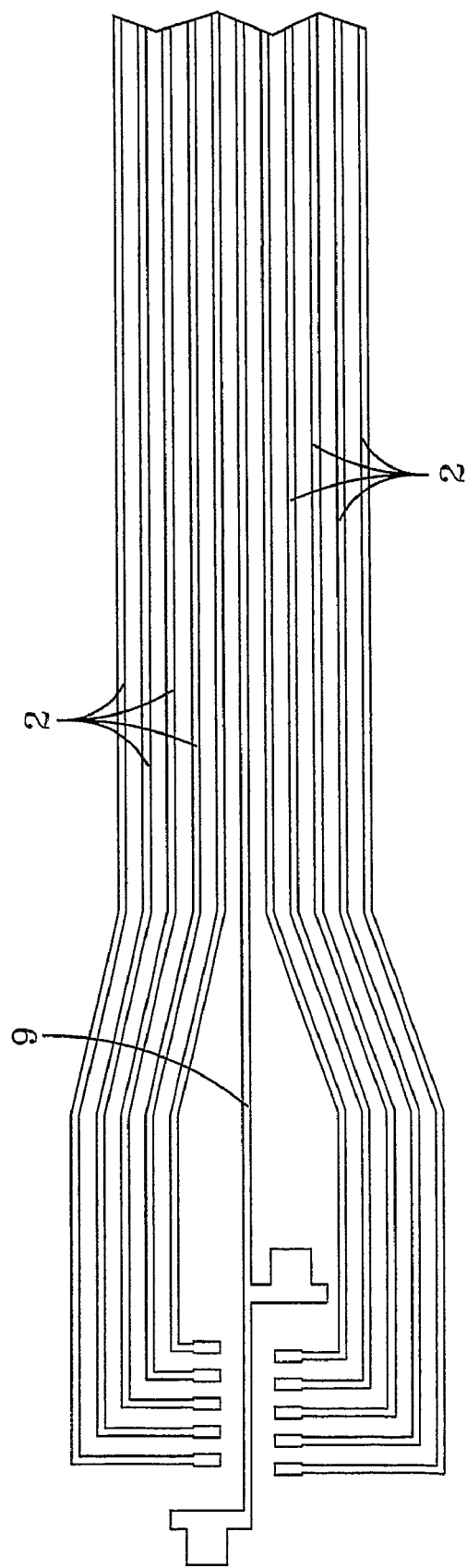
FIG. 5 is a schematic view of yet another configuration of conductive paths of a book spread identification arrangement, according the first embodiment of the invention.
Figure 6:
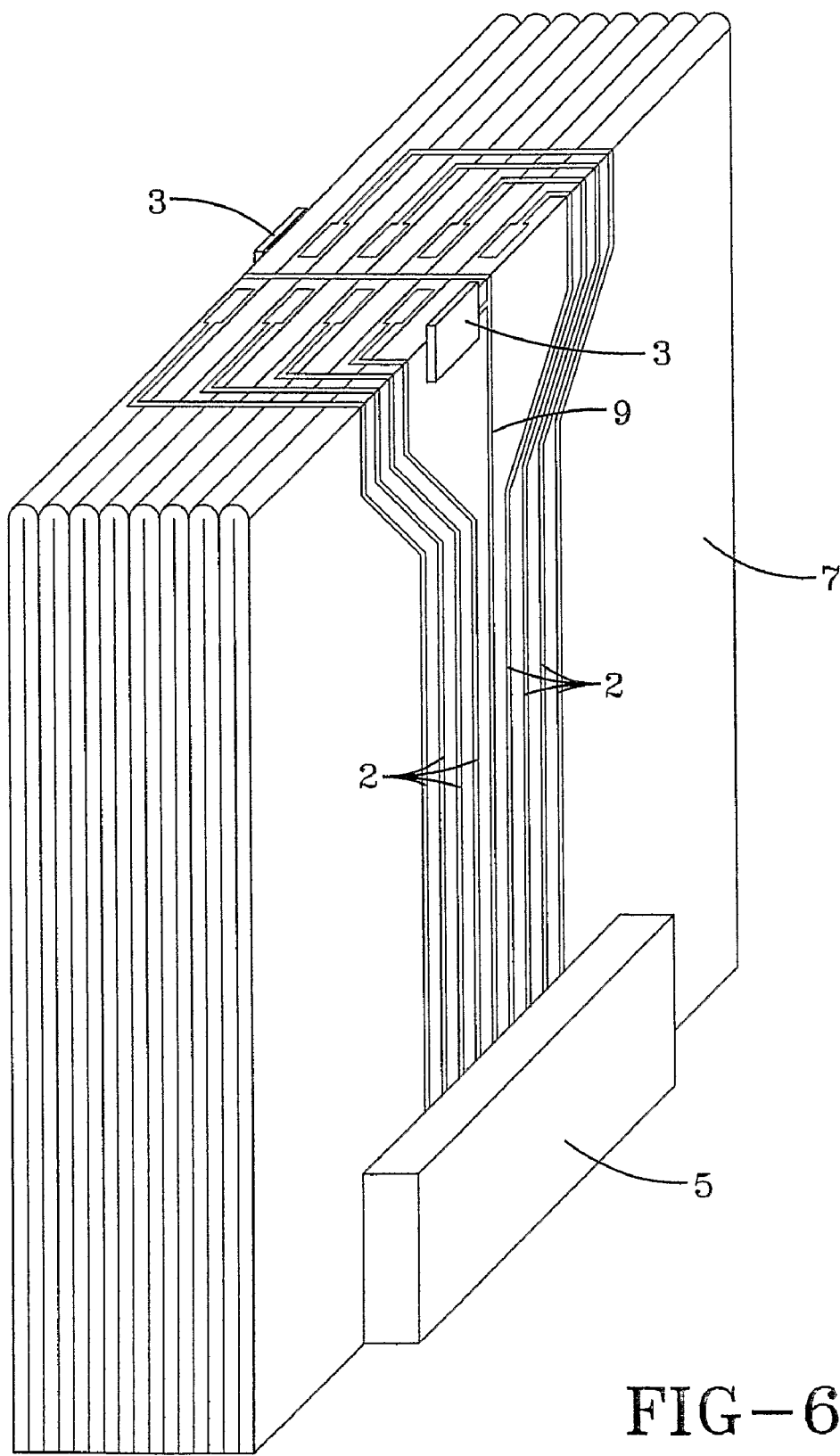
FIG. 6 is a schematic perspective view of the spine surface of a book having the book spread identification arrangement according to the first embodiment of the invention, wherein the conductive paths are in the second configuration of FIG. 5.

FIGS. 5 and 6 show an embodiment where the set of conductive paths configured for conducting the front page conductive strip and the set of paths conducting the back page strip are similarly arranged and symmetrically disposed with regard to path 9 associated with ground potential. The contacting ends of the paths associated with the front page conductive strip and the paths associated with the back page conductive strip are laterally offset with respect to each other to accommodate the fact that they contact different conductive strips. Obvious advantages of said configuration include compactness, simple implementation and reliability.

In the embodiment illustrated in FIGS. 1 to 7, the conductive paths are in the form of conductive traces deposited onto a flexible thin film which, itself, is attached to the spine surface. However, it should be appreciated that other configurations are just as possible. For example, the traces can be directly deposited in the spine surface of the book or can take the form of hot stamped metal lines or metal wires. Similarly, whilst the traces are typically made of silver, silver ink, carbon or other conductive materials, they or can also be made of combination of non-conductive and conductive materials.

Figure 7:
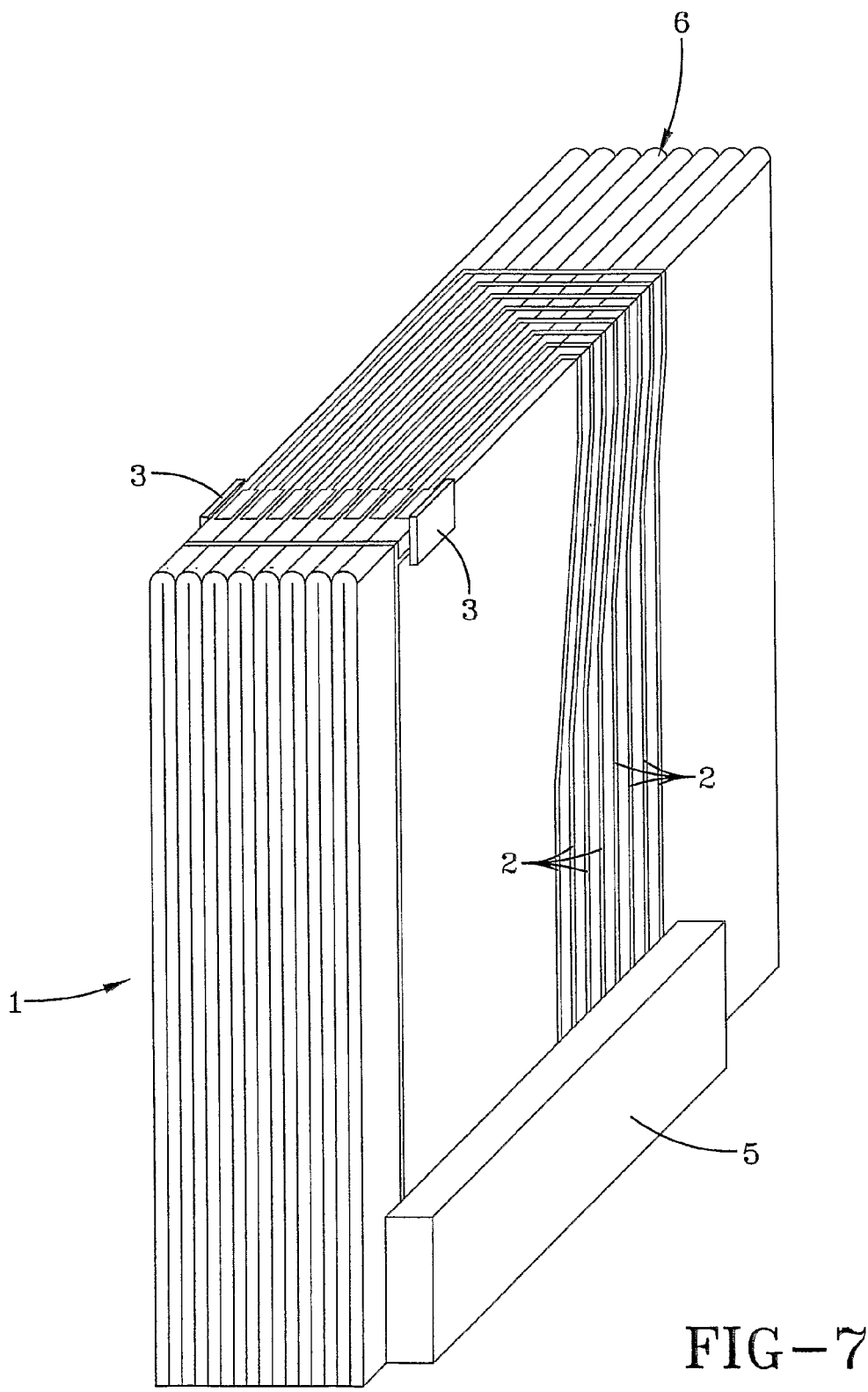
FIG. 7 is a schematic perspective view of the book spread identification arrangement according the first embodiment of the invention, wherein the conductive paths are in a third configuration.

As was mentioned already, the identification of the particular spread of the book is based on identifying the unique combination of circuits closed by the interaction of at least one of the conductive strips with corresponding combination of paths. In the first embodiment, the particular mechanism was associated with the strips being connected to ground and imposing the ground potential on each contacted path. However, there are other mechanisms that can be used in processing the electrical signals from the conductive paths. One example of a second embodiment of the invention using different mechanism is shown in FIGS. 5 to 7. It is important to note that in this second embodiment, when the book is open to a spread, a conductive strip contacts only one path at a time. Among the paths contacted by a single conductive strip (FIG. 6), or by both conductive strips (FIG. 7), each path has unique length and, therefore, unique resistance. The processing IC 5 in this case is arranged to measure the unique resistance of the contacted path and identify the spread corresponding to this path. A skilled addressee would appreciate that the unique resistance of each path can be defined not only by a unique length, but also by other factors including the thickness and width of the path deposition, as well as the specific formulation of path material used. This later factor would include both the specific conductivity of the component materials, as well as the varying ratios of conductive to non-conductive materials used to form the paths. Of course all these factors can be used separately or in combination to define paths of unique known resistance. It should also be noted that instead of contacting a single path, the conductive strips could be arranged to contact a combination of more than one path, where each contacted combination of paths has unique resistance so as to uniquely identify a corresponding book spread.

It should also be noted that the configuration illustrated in FIG. 6 and FIG. 7 is suitable for illustration of both the first and the second embodiments of this invention. The particular embodiment will depend on whether traces 2 are made of conductive material and the spread is identified by identifying a ground potential being imposed on a particular contacted trace, or whether they are made of resistive material and the spread is identified by identifying the resistance of a contacted trace when it is contacted by strip 3.

Figure 8:
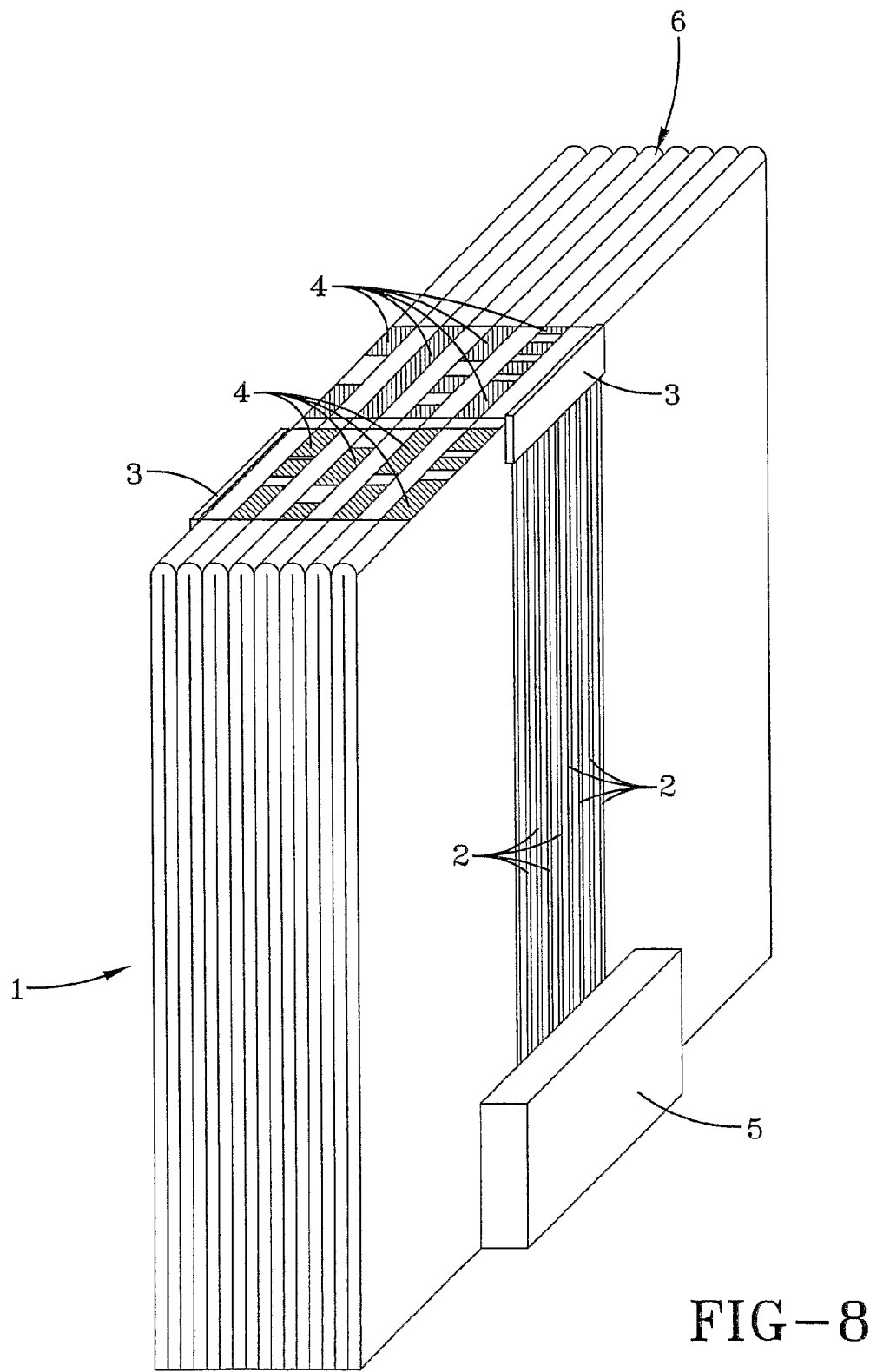
FIG. 8 is a schematic perspective view of a book spread identification arrangement, according a second embodiment of the invention.

In the arrangement illustrated in FIG. 8, the contact means are in the form of the conductive surfaces 4, which define bar code-like sets in the spine surface of the book. The selection end of each conductive path 2 is connected to one of two zebra-type connectors disposed one on each side of the book. As a skilled addressee would be aware of, this type of connectors include a large number of closely spaced electronic terminals that are especially suitable for effecting the contact with the bar code type set of conductive surfaces 4. Other similar connectors including separate conductive leads can also be used for the present application. The arrangement is such that, upon opening of the book to a particular spread, a unique set of surfaces contacts a predetermined unique combination of paths within one of the zebra-type connectors.

Whilst the conductive surfaces within each set generally have a predetermined unique combination of size and/or position, it will be appreciated that the same bar code, or combination of conductive surfaces, can be re-used with a second conductive strip. As long as the IC is configured to identify the fact that identical combinations are associated with different strips. What is important once again is that each spread is associated with a unique combination of signals that can be identified by used by the IC to identify the spread. It is envisaged that the use of a single zebra-type connector or more than one such connectors on each side, that can contact the conductive surfaces independently or simultaneously, is also possible.

Figure 9:
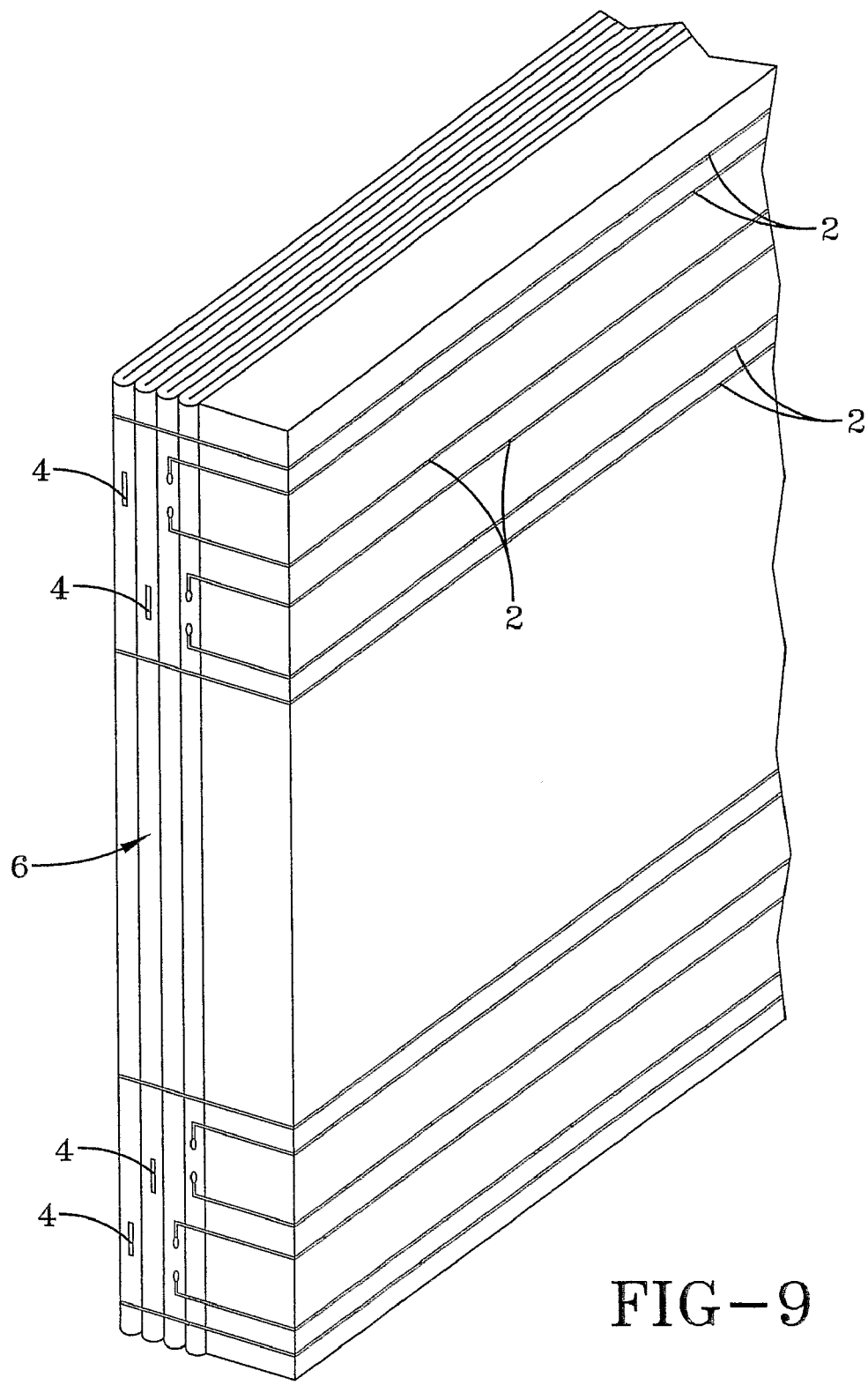
FIG. 9 is a schematic perspective view of a book spread identification arrangement, according a third embodiment of the invention.

In FIG. 9, the contact means are in the form of conductive surfaces 4 disposed in or parallel to the spine surface of the book. Similarly to FIGS. 6 and 7, FIG. 9 shows an arrangement where the contact between the conductive strips 4 and the paths 2 can be used in two different ways. As in the first embodiment, if strips 4 are connected to ground, opening the book to a particular spread would connect to ground a selected combination of a pair of conductive paths, which will close a unique combination of circuits that can be used by the IC to identify the spread. However, if each pair of conductive paths in FIG. 9 defines a circuit of unique predetermined resistance and strips 4 are only used to close the circuits, a closed circuit resulting from contact of the paths 2 with conductive strip 4 can be used by the IC to measure the resistance of the circuit and to identify the corresponding spread in this way. Again, the unique resistance can be defined by the length, thickness, width or the material of at least one of the conductive paths included in each pair, where these factors can be utilised either separately or in combination.

Figure 10:
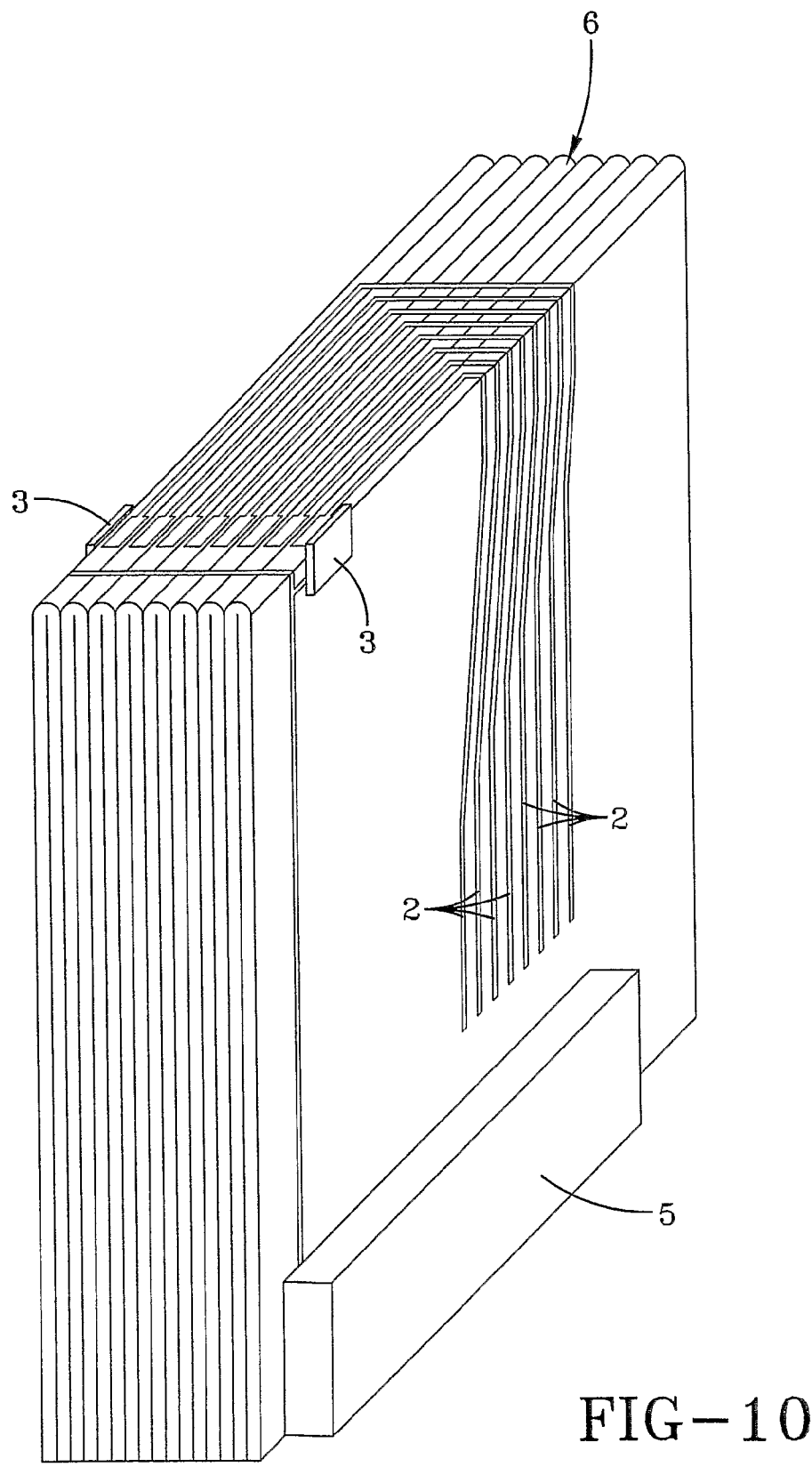
FIG. 10 is a schematic perspective view of a book spread identification arrangement, according a fourth embodiment of the invention.

Yet another embodiment is disclosed in FIG. 10. The conductive paths there are again of a unique length. Notably, their "processing" ends are not connected to the processing IC 5. Only the conductive surfaces 3 are connected to the IC, but they are not connected to ground. The conductive surfaces 3 are arranged such that, upon opening of the book to a spread, a conductive surface contacts the end of a single conductive path of a predetermined length. The IC and the conductive surfaces are configured for sending an electromagnetic pulse along the contacted path and receiving the return signal. Since each path has unique length, the time of return trip of the electromagnetic pulse along each path would be different. Accordingly, the processing IC 5 is arranged to calculate the time of a return trip of the pulse, estimate the traveled length and identify the contacted conductive path so as to determine the corresponding spread the book is open to.

It can be noted that if a board book includes an odd number of spreads, when the book is open at the central spread, most of the embodiments, including a protruding conductive strip, as illustrated in FIG. 1, will not operate properly, since the conductive strips will extend beyond the spine surface of the book. In this situation, introducing a spacer at either the front or the back of the book offsets the relative position of the conductive strips and allows it to contact at least one conductive path when the book is open up to the central spread.

Once the spread, to which the book is open, is identified, the processing means can trigger at least one of audio, visual or audio/visual presentation associated with the spread. The presentation can include reading of a text, singing a song, playing music or any combination of these. Whilst the text, music and songs are usually directly related to the content of the particular spread, this does not have to be the case and they can be played completely randomly. In addition, a screed built in the book or totally separated from the book, but remotely controlled by the processing means, can be used to present images that, again, are either related, or not, to the content of the spread. Furthermore, the processing means can actuate mechanical movements of parts of a mechanical structure associated with the book. One example of such structure is a mechanical character that appears to be reading the text, or otherwise involved in the audio/video presentation. Again, the mechanical device can be either an integral part of the book, or an independent device remotely controlled by the processing means.

It should be appreciated that the book spread identification arrangement for a board book according to the invention presents a simple and reliable system for spread identification that is triggered automatically upon opening of the book to a particular spread.

Whilst the abovementioned embodiments of the present invention are described with reference to a board book, it should be understood that the present invention could be used, but is not limited to, any similar applications where the thickness of the pages would permit depositing conductive surfaces of dimensions that would allow contact and detection.

The term "comprising" (and its grammatical variations) as used herein is used in the inclusive sense of "having" or "including" and not in the exclusive sense of "consisting only of".

The invention claimed is:

1. A book spread identification arrangement for a board book having a spine, the arrangement comprising:
   a plurality of conductive paths, one selection end of each path being disposed on the spine surface of the book;
   contact means, comprising one or more conductive surfaces, the contact means being disposed adjacent at least a part of at least one of the conductive paths disposed on the spine of the book and arranged, upon opening of the book to a spread, to contact on a surface of the spine of the book one of a plurality of combinations of one or more of the conductive paths, each of the plurality of combinations being in a predetermined unique association with a respective spread of the book; and
   processing means connected to the conductive paths and configured for processing signals associated with the conductive paths so as to determine the combination of conductive paths contacted by the contact means and identify the spread the book is open to.

2. An arrangement according to claim 1, wherein the contact means are arranged on the spine to contact the paths adjacent their selection ends, the other processing end of each path being connected to the processing means, the arrangement being such that contact between at least one of the conductive surfaces of the contact means and each of the plurality of combinations of one or more conductive paths closes a predetermined unique combination of one or more circuits associated with the processing means, the processing means being arranged to determine the combination of closed circuits and identify the corresponding spread.

3. An arrangement according to claim 2, wherein the contact means are maintained at a predetermined common potential such that contact with the contact means brings the particular combination of contacted paths under the common potential.

4. An arrangement according to claim 3 wherein:
   at least one of the plurality of conductive paths is of unique length and is, at least partially, disposed in or parallel to the spine surface of the book.

5. A book spread identification arrangement for a board book having a spine, the arrangement comprising:
   a plurality of conductive paths, one selection end of each path being disposed adjacent the spine surface of the book; contact means, comprising one or more conductive surfaces, the contact means being disposed adjacent at least a part of at least one of the conductive paths and arranged, upon opening of the book to a spread, to contact one of a plurality of combinations of one or more of the conductive paths, each of the plurality of combinations being in a predetermined unique association with a respective spread of the book; and processing means connected to the conductive paths and configured for processing signals associated with the conductive paths so as to determine the combination of conductive paths contacted by the contact means and identify the spread the book is open to,
   wherein the contact means are arranged to contact the paths adjacent their selection ends, the other processing end of each path being connected to the processing means, the arrangement being such that contact between at least one of the conductive surfaces of the contact means and each of the plurality of combinations of one or more conductive paths closes a predetermined unique combination of one or more circuits associated with the processing means being arranged to determine the combination of closed circuits and identify the corresponding spread, and
   the contact means comprise at least a first conductive strip arranged to protrude beyond the spinal surface of the book so as, upon opening of the book to at least some of the spreads, to effect the contact with the corresponding unique combinations of conductive paths.

6. An arrangement according to claim 5, wherein the contact means further comprise a second conductive strip, electrically connected to the first conductive strip, the second strip being arranged on the side of the book, opposite to the side having the first contacting strip, such that to protrude beyond the spine surface of the book so as, upon opening of the book to at least some of the spreads, to effect the contact with the corresponding unique combinations of conductive paths.

7. An arrangement according to claim 6, wherein the conductive paths are divided into two sets, each conductive strip being arranged for contacting only paths of a single set.

8. A book spread identification arrangement for a board book, the arrangement comprising:
   a plurality of conductive paths, one selection end of each path being disposed on a spine surface of the book;
   contact means, comprising one or more conductive surfaces disposed adjacent the selection end of at least one of the conductive paths and arranged so that, upon opening of the book to a spread, at least one of the surfaces contacts a single conductive path of a predetermined length on the spine surface of the book, the contact means being configured for sending an electromagnetic pulse along the contacted path and receiving the return pulse; and
   processing means connected to the conductive surfaces of the contact means and configured for processing signals associated with the conductive paths, calculating the time of a return trip of a pulse, estimating the traveled length and identifying the particular conductive path so as to determine the corresponding spread the book is open to.

9. An arrangement according to claim 1 wherein, if the book comprises an odd number of spreads, a spacer is inserted in the book so as to introduce an offset and allow the contact means to contact at least one conductive path when the book is open at the central spread.

10. An arrangement according to claim 1 wherein, upon identification of the spread, the processing means trigger at least one of audio, visual or audio/visual presentation associated with the spread, the presentation including at least on of the following; reading of a text, singing a song, playing music, presenting images on a screen associated with the book and actuating mechanical movements of parts of a mechanical structure associated with the book.

11. A board book including
   a spine and a plurality of pages, including a front page and a back page,
   a plurality of conductive paths, a portion of at least some of the paths terminating along the spine,
   a conductive strip attached to or near at least one of the pages, said conductive strip being along the spine and positioned with respect to said portions of the conductive paths so that opening the book to a selected spread moves the conductive strip into electrical contact with a portion of one or more of the conductive paths to provide a combination of conductive paths uniquely associated with the selected spread, and
   a signal processor connected to the conductive paths and configured for processing signals associated with the conducive paths so as to determine the combination of conductive paths contacted by the conductive strip upon opening the book to the selected spread and to identify the selected spread.

12. The board book of claim 11 including a pair of conductive strips, a first conductive strip attached to the front page and a second conductive strip attached to the back page.

* * * * *